United States Patent [19]

Haake

[11] 3,811,685

[45] May 21, 1974

[54] CASSETTE TAPE RECORDER WITH INDEXING HEAD

[75] Inventor: Robert Haake, Monrovia, Calif.

[73] Assignee: Bell & Howell Company, Chicago, Ill.

[22] Filed: Dec. 3, 1971

[21] Appl. No.: 204,610

[52] U.S. Cl. .......... 360/92

[51] Int. Cl. .......... G11b 5/00, G11b 15/26

[58] Field of Search .......... 274/4 F, 4 D; 179/100.2 Z

[56] References Cited

UNITED STATES PATENTS

| | | | |
|---|---|---|---|
| 3,001,025 | 9/1961 | Gaubert | 274/4 F |
| 3,317,212 | 5/1967 | Tatter et al. | 274/4 F |
| 3,650,413 | 3/1972 | Weigel | 274/4 F |
| 3,533,633 | 10/1970 | Wilder | 274/4 D |
| 3,278,188 | 10/1966 | Chamberlin | 274/4 F |
| 3,733,078 | 5/1973 | Staar | 274/4 A |
| 3,659,857 | 5/1972 | Marcinkus | 274/4 F |

*Primary Examiner*—Harry N. Haroian
*Attorney, Agent, or Firm*—Hume, Clement, Brinks, William, Olds & Cook, Ltd.

[57] ABSTRACT

There is disclosed tape recorder-reproducer which is adapted to receive and play a plurality of tape cassettes of the type having a plurality of separately playable record tracks, at least one of the record tracks being recorded in a direction opposite from the second of the record tracks. More particularly, the improvement in the tape recorder-reproducer comprises a movable record-reproducer head and a means for selectively indexing the head from a first position to a second position wherein the head reproduces one of the record tracks of the first cassette when in the first position and one of the tracks of the second cassette when the head is in the second position. Additional features are also disclosed.

12 Claims, 13 Drawing Figures

CASSETTE TAPE RECORDER WITH INDEXING HEAD

The present invention relates generally to tape recorder-reproducers or the like and, more particularly, is directed to an apparatus for handling and automatically playing a plurality of conventional tape cassettes in a preselected sequential order.

Those concerned with the developement of cassette tape recorder-reproducers have long recognized the need for a tape recorder-reproducer capable of playing a plurality of tape cassettes sequentially. Heretofore, those cassette tape recorders which were adapted to reproduce with a plurality of tape cassettes have employed a movable tape storage tray containing a multitude of the tape cassettes. In operation, this tape storage tray would advance or index to permit each cassette to be pushed out of the tray and lined up over the drive spindles and aligned with a stationary reproducing head. Since the tray had to be advanced over its total length to play each cassette, the mechanism could not be designed compactly.

To alleviate the problem of a movable tape storage tray, a tape recorder was manufactured which employed a unique "flip-over" mechanism. This tape recorder was disclosed in U.S. Pat. No. 3,603,597, issued to Robert Haake, and assigned to the Bell & Howell Corporation. In this tape recorder, the "flip-over" mechanism removed the cassette from the storage tray and placed it on a play station in alignment with a stationary reproducing head. After the first track had been played, the "flip-over" mechanism inverted the cassette and returned it to the play station so that the second track could be played. After the second track was played, the "flip-over" mechanism removed the cassette from the play station and returned it to the storage tray. This process continued sequentially until all cassettes in the storage tray had been reproduced.

The present invention provides a compact and reliable tape recorder-reproducer which is capable of handling a plurality of cassettes wherein the cassettes are never required to physically move from the tray nor is the tray itself required to move. Instead of advancing the tray or advancing the individual cassette, the record-reproducer head is designed to be advanced or to be indexed from one cassette to the next. By so doing, the cassette need not be handled by any mechanism, the reliability of the recorder is greatly enhanced, and a more compact recorder may be obtained.

SUMMARY OF THE INVENTION

The general purpose of this invention is to provide a tape recorder-reproducer which is adapted to receive a plurality of tape cassettes wherein neither the cassette nor the storage tray for the cassettes is required to move in order to reproduce all of the cassettes. To attain this, the present invention contemplates utilizing a cassette storage means for storing a plurality of cassettes wherein each of the cassettes remains stationary with respect to the tape recorder-reproducer throughout the operation thereof. A movable record-reproducer head is selectively indexed from a first position to a second position wherein the head reproduces one of the tracks of the first cassette when in the first position. After this track has been reproduced, the direction of travel of the tape within the cassette is reversed and the head then reproduces the second track on the first cassette. After the second track on the first cassette has been reproduced, the head is then indexed or moved from the first position to the second position wherein it then automatically plays or reproduces the first track of the second cassette. After the first track of the second cassette has been completed, the tape within the second cassette is reversed and the head reproduces the second track on the second cassette. The head is then indexed or moved to the third cassette and continues in this manner until all of the cassettes in the cassette storage tray have been reproduced wherein the head is then automatically removed from the final cassette and the machine may be turned off.

In addition to the movable indexing head, the present invention provides a unique means wherein both take-up shafts conventionally associated with the cassette recorder extend into the storage bin and pass through each of the cassettes within the storage bin. Each of the take-up shafts contain a plurality of tabs thereon wherein the shafts themselves are axially movable. The tabs are arranged so that only one tab on a shaft engages any selected cassette at any given time. This enables the selective driving of the tape in any one of the cassettes in both directions. This feature in conjunction with the indexing or movable reproducer head allows for the automatic sequential reproduction of all cassettes in the cassette storage tray.

It is, therefore, an object of the present invention to provide a tape recorder-reproducer which is adaptable to play a plurality of cassettes without moving the cassette storage tray.

Another object is to provide a tape recorder-reproducer which is capable of reproducing a plurality of cassettes wherein the cassettes remain stationary with respect to the tape recorder-reproducer.

A further object is to provide a tape recorder-reproducer wherein the reproducer head is movable and may be indexed from one cassette to another.

Still another object is to provide a tape recorder-reproducer wherein the take-up shafts of the recorder-reproducer can selectively engage any one of the cassettes located within a storage tray.

Yet another object is to provide a tape recorder-reproducer of compact and reliable design.

A still further object is to provide a tape recorder-reproducer which permits the continuous repeated play of all tracks of a plurality of cassettes in sequential order.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figures 1, 2, 5:
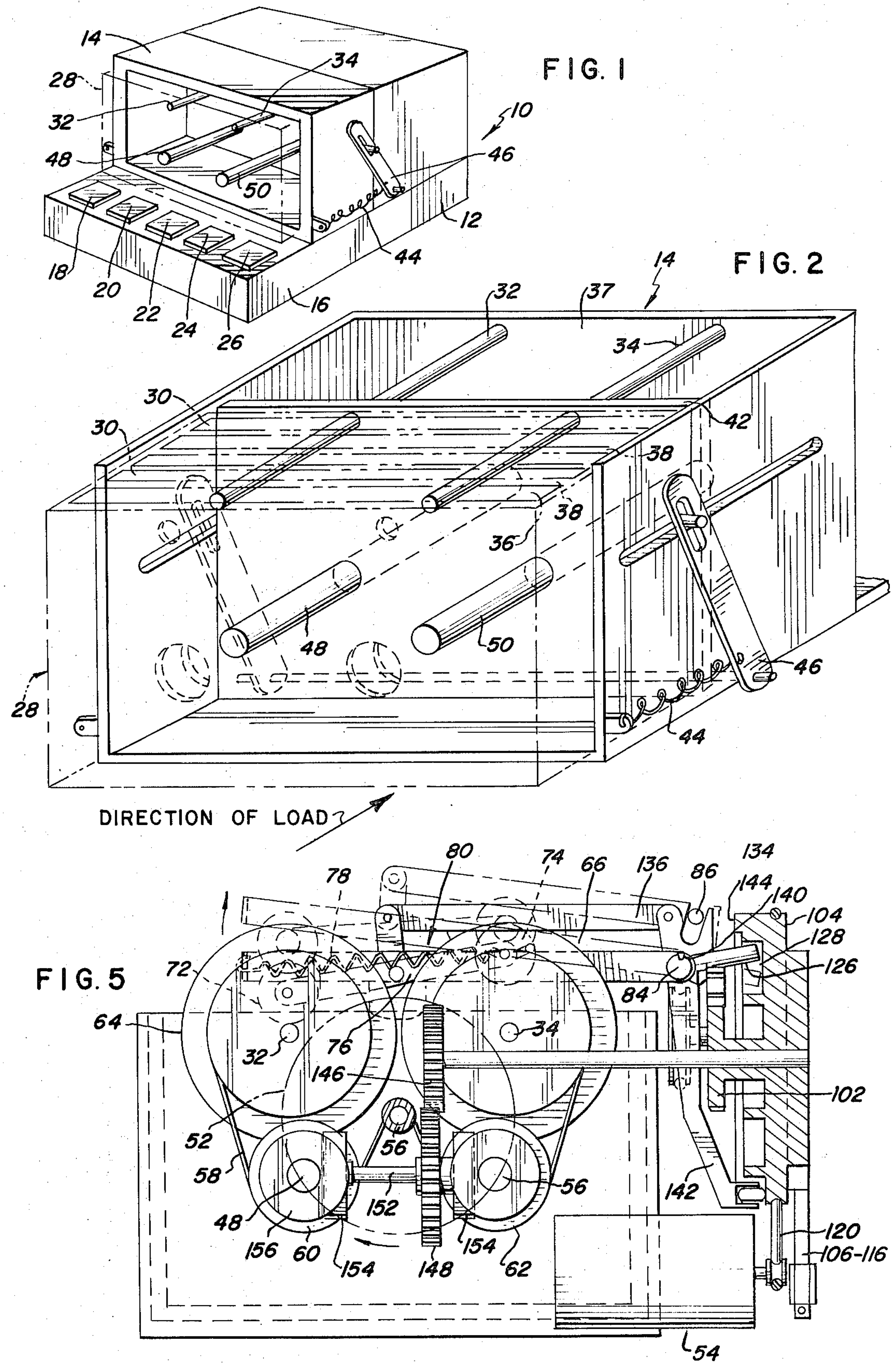
FIG. 1 is a perspective view of a tape recorder-reproducer embodying the various features of the present invention.
FIG. 2 is an exploded enlarged perspective view of a portion of the tape recorder-reproducer housing and of the cassette storage tray shown in FIG. 1, with parts removed.
FIG. 5 is an end view, from the left, of the tape recorder-reproducer shown in FIG. 4.

Referring now to the drawings wherein like reference characters designate like or corresponding parts throughout the several views, there is shown in FIG. 1 a tape recorder-reproducer 10 which is adapted to receive and play a plurality of conventional tape cassettes 30*a*, 30*b*, 30*c*, etc. As used throughout the specification, the term "cassette" means an enclosed tape of the type having a plurality of separately playable record tracks, at least one of the record tracks being recorded in a direction opposite from a second one of the record tracks and being wound upon two wheels or spools which are within the cassette.

The tape recorder-reproducer 10 comprises a housing 12. The housing 12 includes a tray receptacle 14 which is formed as an integral part thereof. However, it will be recognized by one skilled in the art that the tray receptacle 14 need not be integrally formed with the housing 12 and may be formed as a separate component. The housing 12 is adapted to contain the bulk of the conventional audio reproduction and control circuitry (not shown) of a typical tape recorder-reproducer. A forward portion 16 of the housing 12 is provided with a series of conventional controls including reject, play and pause controls 18 and 20 and 22, respectively, as well as an on/off volume control 24 and a reverse control 26. These controls may be push-button controls, knob controls, or any other conventional sources of control. It is appropriate to note at this point that the tape recorder-reproducer 10 has been represented in a rather austere form with aesthetic details and similar structure or refinements omitted for convenience and clarity in explanation.

The tape recorder-reproducer 10 is adapted to play a plurality of tape cassettes without intervention by the operator. The tray receptacle 14 is adapted to receive a cassette storage tray 28. The cassette storage tray 28 contains a plurality of conventional cassettes 30*a*, 30*b*, 30*c*, etc., which are stacked adjacently to one another. While five cassettes are shown in FIG. 1, it will be recognized that any number of cassettes, more or less than five, may be utilized without departing from the spirit and the scope of the invention.

Referring now to FIG. 2 which comprises an exploded enlarged view of the tray receptacle 14 with its top and door removed, as well as the cassette storage tray 28, it can be seen that the tray receptacle 14 contains a pair of capstans 32 and 34, as well as a pair of take-up shafts 48 and 50 protruding through the entire length thereof. The capstans 32 and 34 and the take-up shafts 48 and 50 protrude from the housing 12 and are driven by a tape motor contained within the housing 12 of the tape recorder-reproducer 10 in a manner that will be described below in connection with FIGS. 3–13.

A plate 42 is provided within the tray receptacle 14. The plate 42 is spring loaded under the influence of a pair of springs 44 and a pair of levers 46 which are attached on either side of the plate 42. For simplicity, the plate 42 and its associated springs and levers will be omitted in all other Figures. Apertures are provided in the plate 42 which enable the capstans 32 and 34 and the take-up shafts 48 and 50 to pass through the plate 42 and into the interior of the tray receptacle 14.

As shown in FIG. 2, the cassette storage tray 28 comprises individual compartments 36 which are formed by a plurality of partitions 38. Each of the partitions 38 as well as the back wall 37 of the cassette storage tray 28 contain apertures therein which enable the capstans 32 and 34 and the take-up shafts 48 and 50 to pass through. Before placing the cassette storage tray 28 in its operative position on the housing 12, a plurality of cassettes 30*a*, 30*b*, 30*c*, etc., are placed within the compartments 36 so that they are stacked adjacent to one another and remain stationary throughout the entire operation of the tape recorder-reproducer 10.

The cassette storage tray 28 is loaded into the tray receptacle 14 in the direction of the arrow. The cassette storage tray 28 is forced against the spring loaded plate 42 causing the plate 42 to be compressed against the rear of the tray receptacle 14. As the cassette storage tray 28 is being loaded, the capstans 32 and 34 and after the cassettes have been placed into the cassette storage tray 28, the cassette storage tray 28 is placed in its operative position on portion 14 of the housing 12. The capstans 32 and 34 and the take-up shafts 48 and 50 pass through the apertures in the back wall 37 of the cassette storage tray 28, through the apertures in the partitions 38, as well as through the respective apertures conventionally provided in each cassette. Each partition 38 in the cassette storage tray 28 acts as a bearing for the capstans 32 and 34. It will be recognized by one skilled in the art, that the partitions 38 may be eliminated but, in order to provide adequate support for the capstans 32 and 34, it would be then necessary to provide an additional bearing surface at the non-driven ends of the capstans. An additional bearing surface may be provided in a door 40 (FIG. 6) which is adapted to be fastened to the tray receptacle 14. Thus, during operation of the tape recorder-reproducer 10, it can readily be seen that the spring loaded plate 42 and the cassette storage tray 28 provides adequate longitudinal support for the capstans 32 and 34, as well as for the take-up shafts 48 and 50. When the cassette storage tray 28 is removed, the spring loaded plate 42 moves towards the opening in the tray receptacle 14, thereby providing adequate support for the capstans 32 and 34, as well as the take-up shafts 48 and 50. The spring loaded plate 42 may, however, be eliminated if it is felt that this additional support for the capstans 32 and 34 and the take-up shafts 48 and 50 is not needed.

Figure 3:
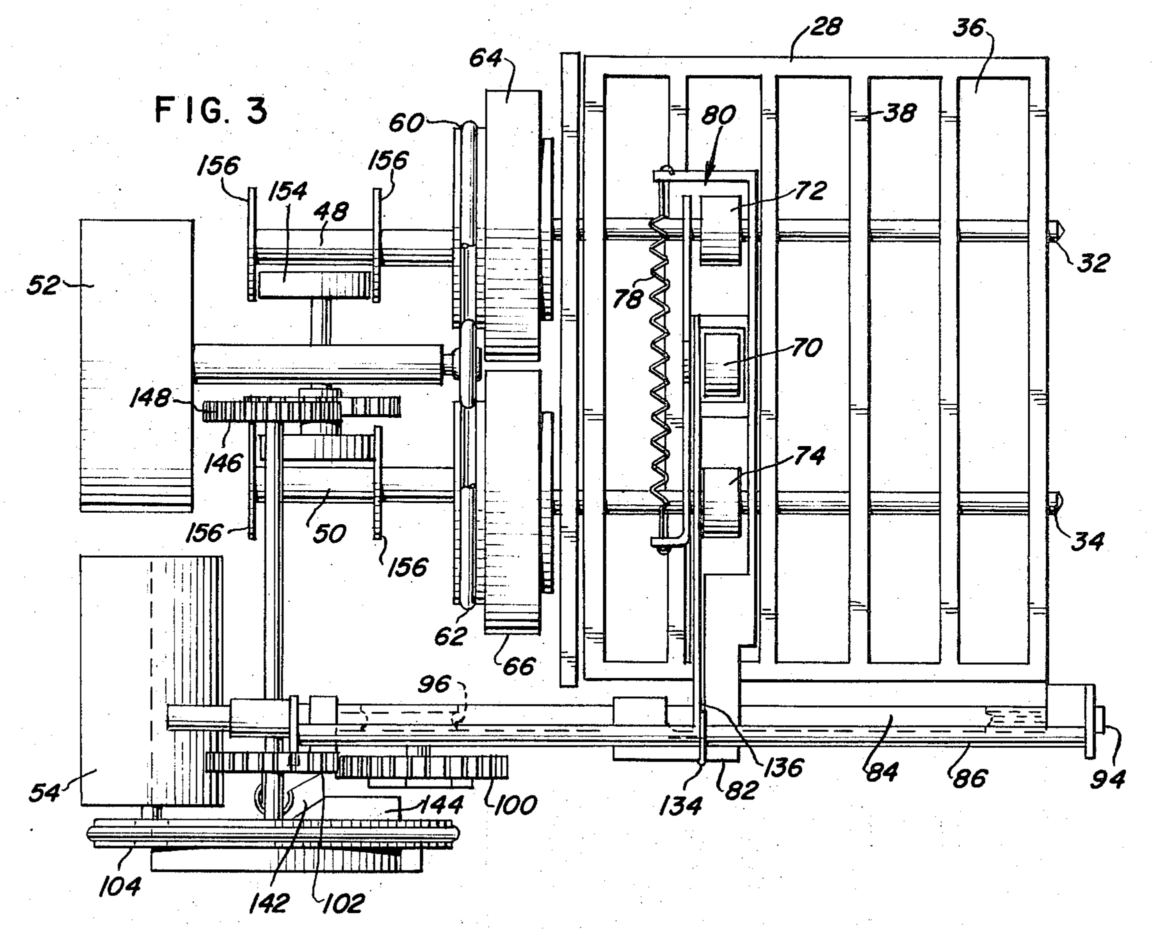
FIG. 3 is a top view of the tape recorder-reproducer of the present invention with the cassette storage tray of FIG. 2 shown in its operative position.
Figure 4:
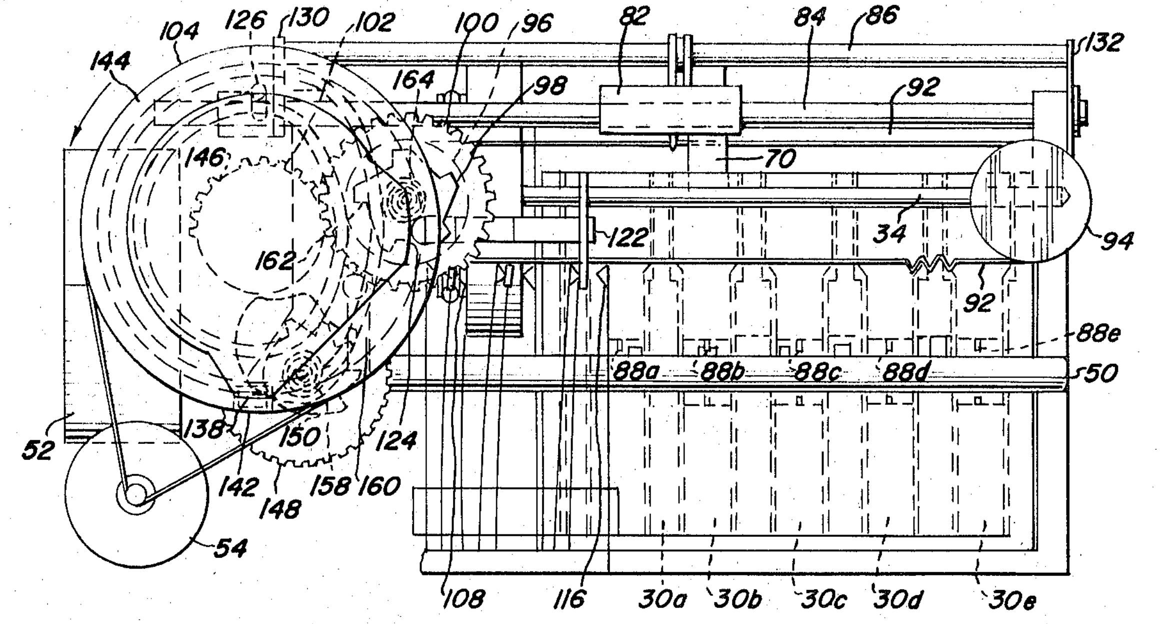
FIG. 4 is a side view of the tape recorder-reproducer shown in FIG. 3.

Referring now to FIGS. 3–5, the cassette storage tray 28 is shown in its operating position within the tray receptacle 14. The tape recorder-reproducer 10 is provided with a tape motor 52 which is adapted to drive the capstans 32 and 34, as well as the take-up shafts 48 and 50. A function motor 54 is also provided. The purpose of the function motor 54 is to control the automatic sequential playing of the individual cassette 30 in a manner as to be described below. The tape motor 52 is adapted to drive a tape motor pulley 56. The tape motor pulley 56 drives the belt 58 which, in turn, drives two take-up pulleys 60 and 62, as well as two fly wheels 64 and 66. As can clearly be seen in FIG. 5, the fly wheels 64 and 66 drive the capstans 32 and 34, respectively, while the take-up pulleys 60 and 62 are used to drive the take-up shafts 48 and 50, respectively.

The capstans 32 and 34 serve a conventional purpose and are used to transport the tape at a uniform speed. Each of the take-up shafts 48 and 50 contain one way clutches. In this manner, one take-up shaft is adapted to drive the tape in a clockwise manner and the other take-up shaft is adapted to drive the tape in a counterclockwise manner. Furthermore, the clutch enables the take-up shafts to rotate at a speed greater than the speed of the capstans whereby the take-up shaft, which is being driven by the tape motor 52, takes up all of the tape being fed by the capstans 32 and 34 without allowing the tension in the tape to slacken. The tape motor 52 is a reversible motor and may be made to operate in either direction by reversing the polarity of the motor. Thus, in combination with the one way clutches in the take-up shafts 48 and 50, the tape may be driven in a forward direction and in a reverse direction. Since a conventional cassette has tracks recorded in both a forward direction and a reverse direction, the reversing of the polarity of the motor will enable the same head to reproduce all tracks on the cassette.

The tape recorder-reproducer 10 is provided with a movable reproducing-recording erasing head 70, hereinafter referred to as the head 70. The head 70 is a conventional record-reproducer head which is adapted to be moved or indexed from one cassette to another in a manner to be described below by the function motor 54. As shown in FIGS. 3 and 4, the head 70 is mounted on a movable carriage 82. The movable carriage 82 is adapted to move laterally along a carriage guide bar 84 and is controlled by an actuating bar 86. The actuating bar 86 is, in turn, itself controlled by the function motor 54.

A pair of pinch rollers 72 and 74 are provided and are mounted on a spring biased lever 76. The lever 76 is biased by a flip-flop spring 78. the flip-flop spring 78 ensures that only one pinch roller, either 72 or 74, is able to functionally engage one of the capstans 32 or 34, respectively. As shown in FIG. 5, the pinch roller 72 is in engagement with the capstan 32 while the pinch roller 74 does not engage the capstan 34. The purpose of the pinch rollers is to ensure that there is no slippage between the tape and the capstan as it is being fed past the head 70. The pinch rollers 72 and 74 and its associated lever 76 and flip-flop spring 78 may be referred to as a pinch roller assembly 80. The movement of the pinch roller assembly 80 is also controlled by the function motor 54 in a manner to be described below.

Both the head 70 and the pinch roller assembly 80 are adapted to be moved laterally by a cable 92 which passes around an idler pulley 94 and a drive pulley 96. The drive pulley 96 is one unit with a head advance ratchet 98 and a gear 100. The gear 100 is actuated by a second gear 102 which, in the preferred embodiment, comprises a six-teeth section gear. The gear 102 is located on the shaft of a main cam 104. The main cam 104 is driven by the function motor 54 and, as will be described below, controls the entire sequential operation of the tape recorder-reproducer 10.

In addition to the movable or indexing head 70 and the pinch roller assembly 80, the tape recorder-reproducer 10 also provides a feature whereby the take-up shafts 48 and 50 are axially movable. In addition, each of the take-up shafts 48 and 50 includes a set of tabs 88*a*, 88*b*, 88*c*, etc., longitudinally spaced along the shafts. One tab is provided for each cassette that is to be used with the recorder. For example, if the tape recorder-reproducer 10 is to have a maximum capacity of five cassettes, then five tabs are provided on each of the take-up shafts 48 and 50. The purpose of the tabs 88*a* through 88*e* is to selectively engage the take-up shafts 48 or 50 with a selected cassette. As can be seen in FIG. 4, the tab 88*b* is in engagement with one spool in the outermost cassette 30*b* while none of the other tabs are in engagement with any of their respective cassettes and thus, the take-up shaft would only be driving the spool or roller in cassette 30*b* and would not be driving any of the rollers in any of the other cassettes. The take-up shafts 48 and 50 are made axially movable by providing the take-up pulleys 60 and 62 keys protruding into a slot 90 (FIG. 6) so that the take-up shafts 48 and 50 can be moved axially. Yet the take-up pulleys 60 and 62 will remain engaged in order to drive their respective take-up shafts 48 and 50.

Now that the essential components of the tape recorder-reproducer 10 have been described briefly, the operation of the tape recorder-reproducer 10 will now be described in greater detail in terms of a functional description with reference to FIGS. 2–13.

The loaded cassette storage tray 28 is pushed against the spring loaded plate 42 into the tape storage housing 14 in the direction of the arrow as shown in FIG. 2. The door 40 of the tray receptacle 14 (FIG. 6) is then closed. At this point, the starting position of the head 70 is over the innermost cassette or, as in FIG. 6, cassette 30*a*. The on/off switch 24 is mechanically coupled with a head lift lever (not shown). The head lift lever may comprise a simple lever which functions to mechanically lift or lower the head 70 from the cassette 30*a*. The turning of the on/off switch 24 to the "on" position lowers the head 70 and the pinch roller assembly 80 to contact the tape in the cassette 30*a*. At this time, the main cam 104 is in the position shown in FIG. 9. The function motor 54 is de-energized or in the "off" condition as is evidenced by an open contact 106. The tape motor 52 is energized or in the on condition as evidenced by a closed contact 108. In this condition, the tape motor 52 runs clockwise (FIG. 5) and is adapted to close contacts 110 and 114 and to open contacts 112 and 113. With the tape motor 52 energized, the take-up pulley 60 drives the take-up shaft 48. The take-up pulley 62, however, idles because of its one way clutch described previously and, therefore, the take-up shaft 50 is not being driven.

In FIG. 5, the tape in the cassette 30*a* is driven to the left because the pinch roller 72 is operably engaged to the capstan 32. Thus, because the head 70 is in engagement with the tape in the cassette 30*a*, which is passing over the capstan 32 and onto the take-up shaft 48, the tape recorder-reproducer 10 is reproducing magnetic information which is on the first track of the cassette 30*a*.

Figure 9:
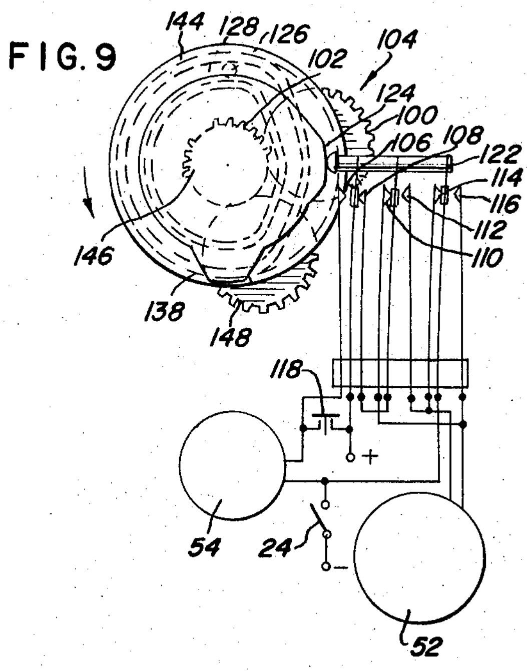
FIGS. 9 through 13 are schematic representations showing the various positions of the main operating cam throughout the operation of the tape recorder-reproducer of the present invention.
Figure 11:
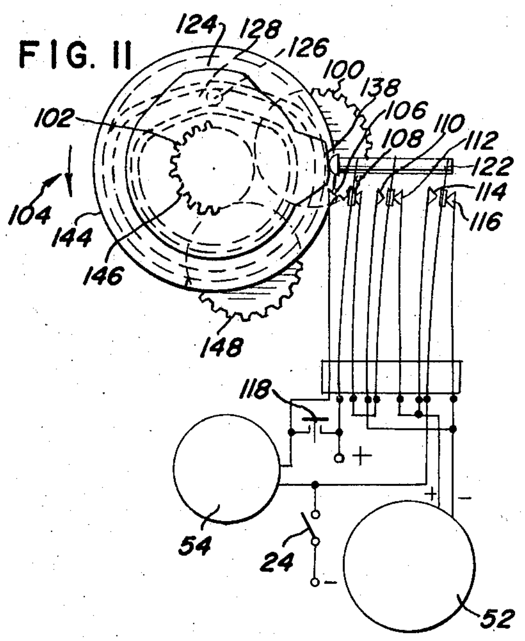
Figures 10, 12, 13:
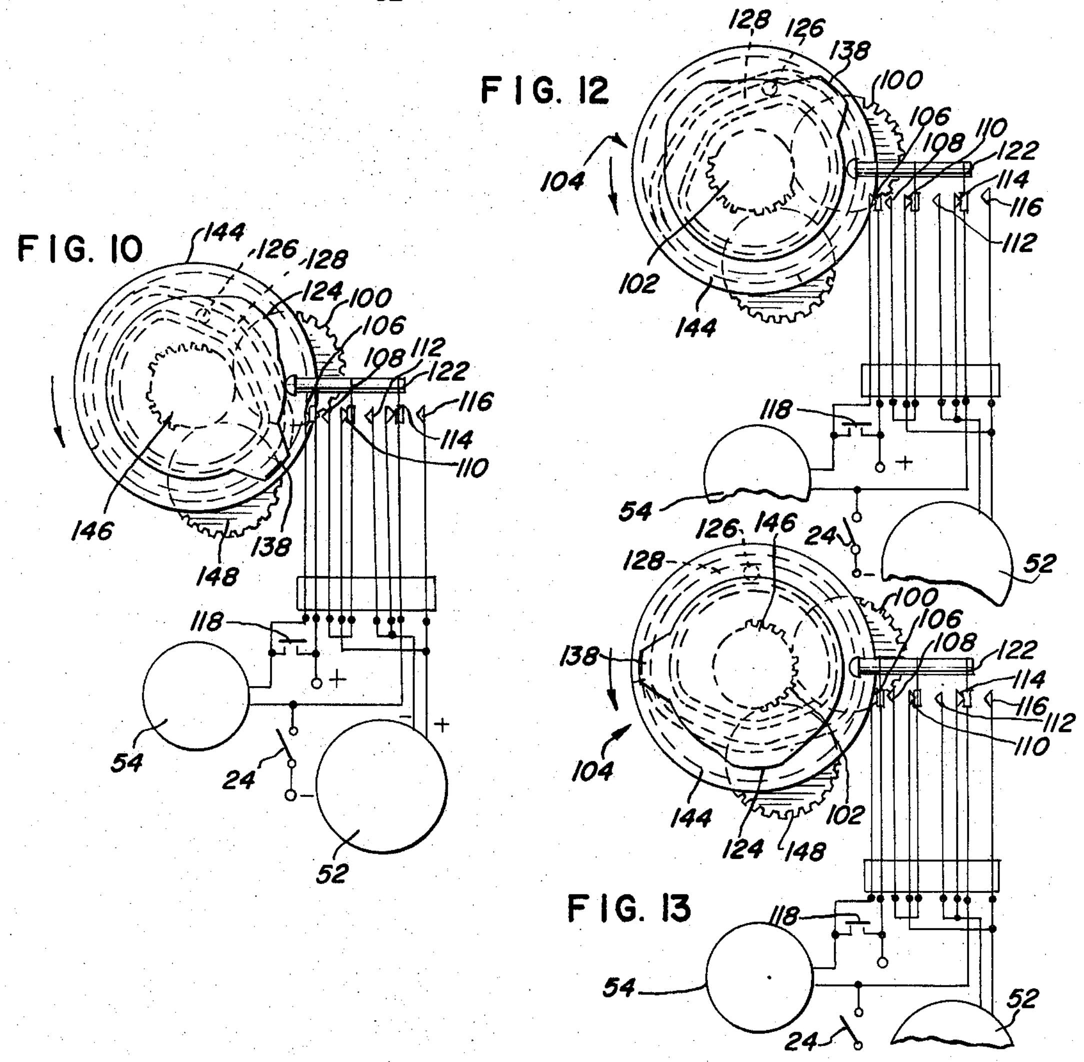

As the tape in cassette 30*a* comes to its end of travel, a conventional motion detector, not shown, senses this condition. This may easily be sensed since the one way clutch associated with the take-up shaft 48 will begin to slip at the end of the tape, thus causing the take-up shaft 48 to stop. The stopping of the take-up shaft 48 causes the actuation of a momentary switch schematically shown in FIG. 9 as switch 118. It will be recognized that the momentary switch 118 is physically located in the proximity of the take-up pulleys 60 and 62 but, for clarity, has not been shown in FIGS. 3–6. The closing of the momentary switch 118 causes the function motor 54 to be energized which, in turn, drives the main cam 104. As seen in FIG. 9, the momentary closing of the switch 118 causes the function motor 54 to be connected to a voltage source, thus energizing the function motor and as shown in FIG. 3, the shaft of the function motor 54 is connected to a belt 120 (FIG. 5) which, in turn, drives the main cam 104. The main cam 104 in FIG. 9, as well as in FIG. 4, rotates counterclockwise. A contact actuator 122, which is in contact with a lobe 124 on the main cam 104 as shown in FIG. 9, then leaves the lobe 124, thereby opening the contact 108 and closing the contact 106. The closing of the contact 106 creates a circuit which bypasses the momentary switch 118 and maintains the function motor 54 in its energized condition. The opening of the contact 108 in turn causes the tape motor 52 to become de-energized, thereby stopping the motion of the tape in the cassette 30*a*. At this stage of operation, the condition of the contacts 106–116 is shown in FIG. 10.

To summarize, the first track of the cassette 30*a* has now been reproduced. It is now necessary to reverse the motion of the tape in the cassette and to engage the pinch roller 74 with capstan 34 in order to reproduce the second track of the cassette 30*a*. It is also necessary to electrically switch tracks in the head 70. These operations may be accomplished as follows.

A lever 126 in FIGS. 4 and 5 protrudes into a groove 128 in the main cam 104. The cam groove 128 pushes the lever 126 down. The lever 126 is an integral unit with a hub carrying lever 130, the actuating bar 86 and a guide lever 132 (all shown in FIG. 4). The actuating bar 86 is engaged in the slot of a link 134 (FIG. 5) pivoted on the carriage guide bar 84 which can actuate the pinch roller assembly 80. The pinch roller assembly 80 is switched over a connecting rod 136 through the flip-flop spring 78 to engage the pinch roller 74 when the main cam 104 rotates to the position shown in FIG. 11. At this point, lobe 138 on the main cam 104 actuates the contact actuator 122 opening the contact 106, thereby stopping the function motor 54 and closing the contact 108, thereby starting the tape motor 52. However, since the lobe 138 is higher than the lobe 124, the contacts 112 and 116 are closed while the contacts 110 and 114 are open, thereby reversing the polarity of the tape motor 52 and, in turn, reversing the direction of the tape motor 52. Simultaneously, an electronic switch (not shown) is actuated which switches the active track on the head 70 to enable it to reproduce the second track on the cassette 30*a;* namely, the track recorded in the reverse direction from the first track previously reproduced.

At this point, to summarize, the head 70 had been placed over the innermost cassette 30*a* and the tape motor 52 was driven in a clockwise fashion, thereby enabling the head 70 to reproduce the first track of the cassette 30*a*. The function motor 54 would then be actuated which, in turn, caused the main cam 104 to rotate in a counterclockwise position. The main cam 104 caused the tape motor 52 to reverse its polarity, thereby reversing the direction of the tape and causing the pinch rollers 72 and 74 to switch their position, thereby enabling the tape in the cassette 30*a* to be driven in a reverse direction. In this direction, the take-up shaft 50 functions to take up the tape passing over the capstans 32 and 34 while the take-up shaft 48 idles because of the one way clutch. In this manner, the tape recorder-reproducer 10 plays the second track of the cassette 30*a* or, in other words, the track which was recorded in the opposite direction to the previously reproduced track.

It should also be recognized that if a four-track stereo cassette were being used rather than a two track cassette, the head 70 would employ four tracks instead of two and in the foward direction, two tracks of the head 70 would be activated to reproduce the two tracks recorded in the first direction and after a reversal of the pinch roller assembly 80 and of the tape direction, the third and fourth tracks of the head 70 would be activated while the first two tracks in the head 70 would be deactivated. In this manner, the remaining two tracks recorded in the second or reverse direction would be reproduced in the manner described above.

Returning again to the functional description of the tape recorder-reproducer 10, it will be recalled that all tracks in the cassette 30*a* have now been reproduced. After the second track of the cassette 30*a* has been reproduced, a motion detector (not shown), in a manner similar to that described above, senses the end of the tape which causes the take-up shaft 50 to stop. The motion detector, in a manner similar to that described before, closes the momentary switch 118, thereby starting the function motor 54.

At this point, it becomes necessary to shift or index the position of the head 70 to the next cassette; namely, cassette 30*b*. As previously mentioned, the head 70 and the pinch roller assembly 80 are mounted on the movable carriage 82 which slides on the guide bar 84 in which a groove 140 (FIG. 5) is provided for the key in the carriage 82 to lift the whole carriage 82 over an arm 142 (FIG. 3) which is being actuated by a face 144 of the main cam 104. The face 144 of the main cam 104 which is acutating the arm 142, is shown as the darkened area of the periphery of the main cam 104 in FIGS. 9–13. The head 70 and the pinch roller assembly 80 are then advanced by the cable 92 which runs around the idler pulley 94 and the drive pulley 96. The drive pulley 96 is integral with the head advance ratchet 98 and the gear 100. As mentioned previously, the gear 100 is actuated by the six-teeth section gear 102 on the shaft of the main cam 104.

Figure 6:
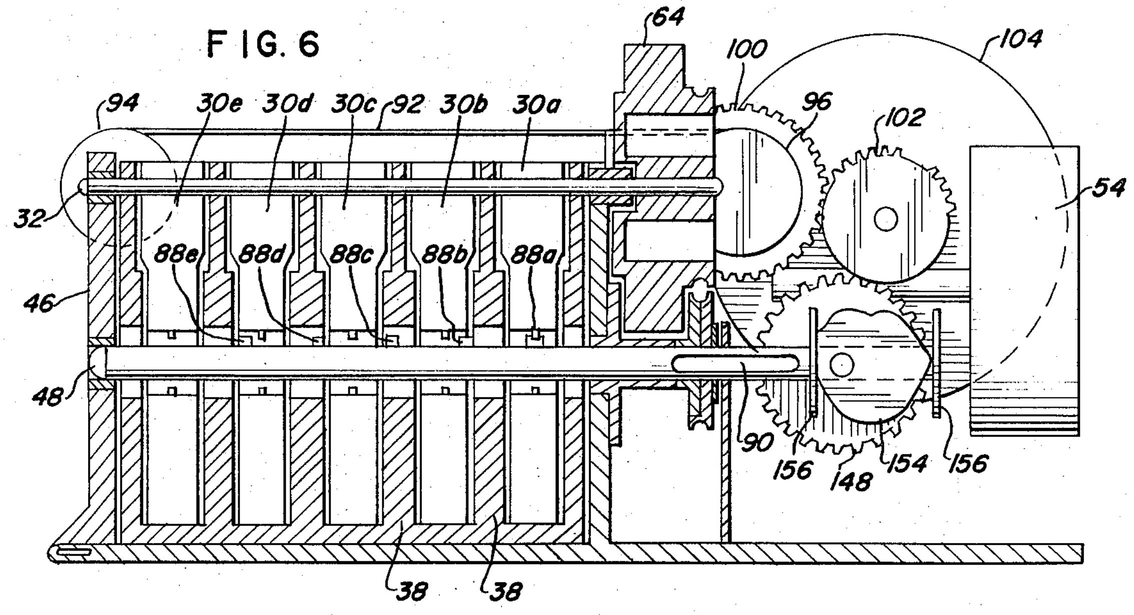
FIG. 6 is a cross-sectional view of the tape recorder shown in FIG. 4, looking from the reverse side, showing the position of the main operating cam, the take-up advance cam, and the take-up shaft when the first cassette is being reproduced.
Figure 7:
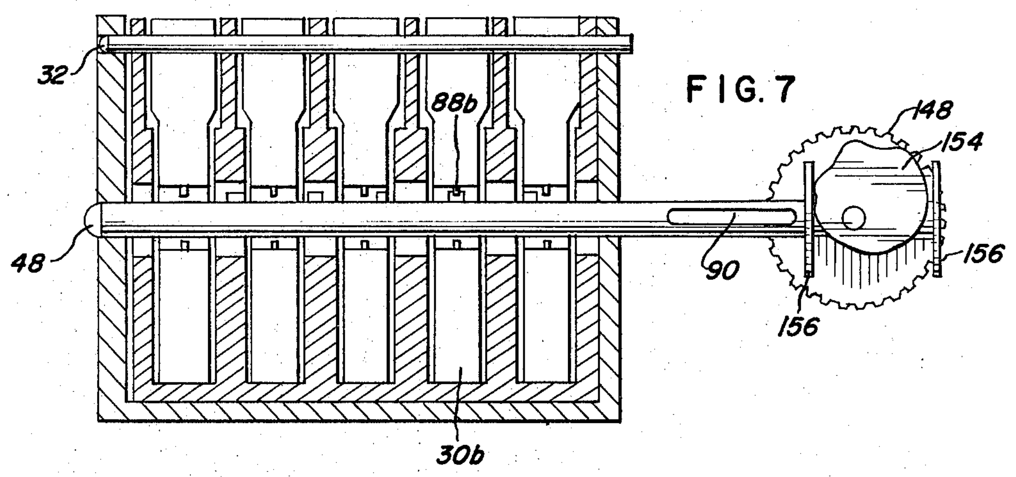
FIG. 7 is a cross-sectional view similar to FIG. 6 with parts removed showing the position of the take-up advance cam and of the take-up shaft when the second cassette is being reproduced.
Figure 8:
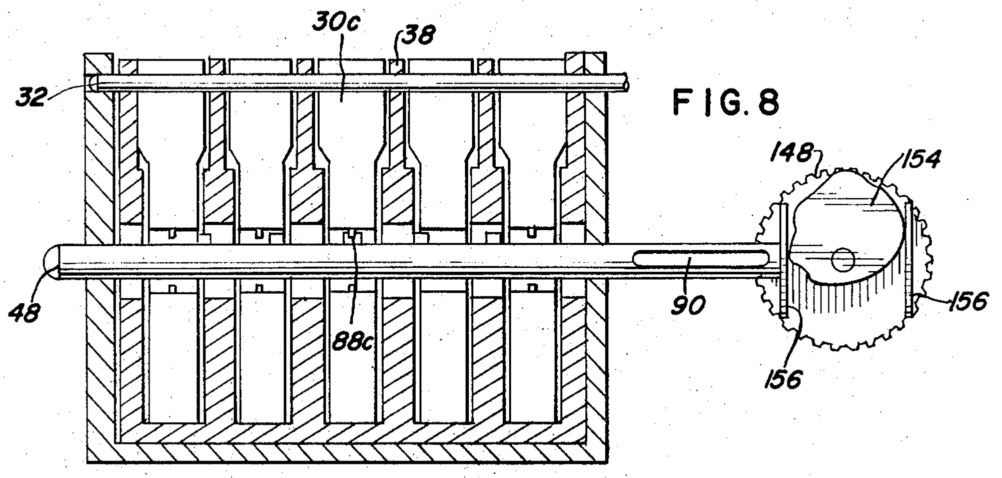
FIG. 8 is a cross-sectional view similar to FIG. 7 showing the position of the take-up advance cam and the take-up shaft when the third cassette is being reproduced.

A gear 146 which, in the preferred embodiment, is a four-teeth section gear, behind the six-teeth gear 102, engages with a gear 148 mounted on a take-up advance ratchet 150 and on a shaft 152 carrying the two take-up advance cams 154. The takeup shafts 48 and 50 can be moved axially by the take-up advance cams 154. The position of the take-up advance cams 154 is determined by the take-up advance ratchet 150. By moving the take-up shafts 48 and 50 axially, the position of the tas 88*a*, 88*b*, 88*c*, etc. may be moved to selectively shift their engagement from one cassette to the next one for each complete revolution of the main cam 104. In the preferred embodiment, for a five-cassette recorder, each tab is offset one-eighth of an inch with respect to the next center of the consecutive cassette as shown in FIGS. 6–8. As mentioned previously, the take-up pulleys 60 and 62 are provided with keys protruding into the slot 90 (FIG. 6) so that the take-up shafts 48 and 50 can be moved axially without disengaging the pulleys from driving the take-up shafts 48 and 50. As seen in FIGS. 3 and 6, the take-up advance cam 154 is positioned between a pair of discs 156 which is part of each take-up shaft 48 or 50.

Returning to the funtional operation of the tape recorder-reproducer 10, it will be recalled that both the forward and reverse tracks of cassette 30*a* had been played and the motion detector started the function moor 54 and stopped the tape drive motor 52. The position of the main cam 104, as well as the contacts 106–116, are that as shown in FIG. 12. As the lobe 138 moves counterclockwise, the contact actuator 122 moved back to its rest position, closing the contact 106, thereby completing the circuit which bypassed the momentary switch 118 and maintained the function motor 54 in its energized condition while opening the contact 108, thereby stopping the tape motor 52. At this point, the four-teeth section gear 146 engaged with the gear 148 thereby rotating the take-up advance cam 154 by about 50° against a spiral spring 158 to a position as shown in FIG. 7. A spring loaded pawl 160 is placed against the take-up advance ratchet 150 keeping it in this position. By rotating the take-up advance cam 154 by approximately 50°, the take-up shafts 48 and 50 are pushed axially forward by one-eighth of an inch, thereby enabling the tab 88*b* on the take-up shaft 48 or 50 to engage the second cassette 30*b*.

As the main cam 104 keeps turning, the pinch rollers 72 and 74 are flopped back by the cam groove 128 in the main cam 104, again engaging the pinch roller 72 and disengaging the pinch roller 74. The face 144 of the main cam 104 then pushes against the arm 142, thereby lifting the head 70 and the pinch roller assembly 80 enough to clear the pinch rollers 72 and 74 and the head 70 from the top of the cassette storage tray 28. As the main cam 104 continues to rotate, the six-teeth section gear 102 engages with the gear 100 which serves as the head indexing gear to which the drive pulley 96, with the cable 92, is mounted and moves the head 70 and the pinch roller assembly 80 against the spiral spring 158 to its correct position with regard to the second cassette 30*b*, as shown in FIGS. 3, 4, and 7. The head advance ratchet 98 on the gear 100 maintains it in this position by a pawl 162. The pawls 162 and 260 are both spring loaded but are independent of each other and are on the same pivot. Since the face 144 on the main cam 104 passes by, the head 70 and the pinch roller assembly 80 are lowered again into contact with the tape in the cassette 30*b*. The main cam 104 then returns to its original position as shown in FIG. 9. The lobe 124 opens the switch contact 106 and closes the switch contact 108, thereby stopping the function motor 54 and then starting the tape motor 52 in its original direction. The tape recorder-reproducer 10 begins to reproduce or play the first track on the second cassette 30*b*. Thus, it can be seen that the main cam 104 rotates 360° for each complete cassette play.

After the first track of the cassette 30*b* has been reproduced, the tape motor 52 stops and the function motor 54 agains starts in the manner described above. The pinch roller assembly 80 is again reversed and the track in the head 70 is again changed. The tape motor 52 is then energized in its reverse mode and the function motor 54 is de-energized, thus enabling the tape recorder-reproducer 10 to play the second track on cassette 30*b*.

When the second track on cassette 30*b* is completed, the function motor 54 is again started which ultimately lifts the head 70 and pinch roller assembly 80 from the second cassette 30*b* and places it in position to reproduce the third cassette 30*c*. The shafts 48 and 50 are again moved axially to the position shown in FIG. 8. The pinch roller assembly 80 and the tape motor 52 are reversed, the track of the head 70 is again changed, and the first track of the third cassette 30*c* is then reproduced.

Each of the above described functions repeats itself until all tracks of all cassettes have been played. When the second track of the last cassette 30*e* has been played and the end is sensed by the motion detector, the function motor 54 again starts from the position shown in FIG. 11. At this point, the pinch roller assembly 80 flips to engage the pinch roller 72. The head 70 in the roller assembly 80 is lifted again by the face 144 of the main cam 104. The six-teeth section gear 102 moves the head 70 and the pinch roller assembly 80 to the right as seen in FIG. 4 past cassette 30*e*, where it hits a lever (not shown) which moves both spring-loaded pawls 160 and 162 counterclockwise releasing both ratchets 150 and 98, so that the take-up advance cam 154 springs back by means of the spiral spring 158, thereby pulling the take-up shafts 48 and 50 back to engage the first cassette 30*a*. The drive pulley 96 mounted to the gear 102, also springs back by means of a spiral spring 164 so that the head 70 and the pinch roller assembly 80 springs back to the position shown in FIG. 6. This permits th continuous repeated play of both sides of all the cassettes.

It will also be recognized that by pushing the start switch 118 (FIGS. 9 to 13), the play can be interrupted at any time. Momentary closing of the contact 118 starts the function motor 54 as if it were energized by means of the motion detector and causes the sequential play of either the second track or the first track of the next cassette depending on the track being played. By pushing the start switch for a prolonged time, the function motor keeps the main cam 104 rotating, cycling in sequence through tracks and cassettes until the start button is released at the desired cassette and track. It can be seen that this enables the operator to select any cassette and track in sequence, bypassing the play function.

It will be recalled that during the description of the operation of the tape recorder-reproducer 10, after the head 70 has reproduced the first track on a cassette, the motion of the tape is reversed and the pinch roller assembly 80 is reversed and at this point, it became necessary to switch the head track through electrical means so that the proper track on the head would be energized to reproduce the second track on the cassette. It will also be recognized that rather than using a multiple track head, a single track head could be employed if a means were present to physically reverse the position of the head 180°. In this manner, a single track head could be used to replace a multiple track head disclosed herein.

In summary, the operation of the tape recorder-reproducer 10 is as follows. The cassette storage tray 28 with its plurality of cassettes 30*a* – 30*e* are inserted into the tray receptacle 14 and the tape recorder-reproducer 10 is turned on through the use of the on/-off volume switch 24. At this point, the tape motor 52 is energized, the head 70 engages the tape in the cassette 30*a* and the pinch roller 72 engages the capstan 32. The tape recorder-reproducer 10 then reproduces the first side of the first cassette 30*a*. A motion detector senses the end of the tape and starts the function motor 54, thereby beginning the rotation of the main cam 104. While the main cam 104 goes through a 90° rotation, the contacts 106–116 stop the tape motor while additional contacts switch the head track so that the proper head track is energized. The groove cam 128 flips the pinch rollers 72 and 74 so that the pinch roller 74 engages the capstan 34. The contacts 110–116 then reverse the tape motor direction and the take-up shaft 50 then functions as a take-up shaft because of the one way clutch, while the take-up shaft 48 idles. The start of the tape motor 52 then causes the function motor 54 to stop due to the reversal of the contacts 106 and 108. The tape recorder-reproducer 10 then plays the second track of the first cassette 30*a*.

After the motion detector senses the end of the tape of the second track of the first cassette 30*a*, the function motor 54 is again started. At this point, the main cam has now gone through a 270° rotation. The contacts 106–116 again stop the tape motor 52 and the cam face 144 of the main cam 104 lifts the head 70 and the pinch roller assembly 80. The head tracks are again switched electronically and the six-teeth section gear 102, which is attached to the main cam 104, advances the head 70 in the pinch roller assembly 80 to the second cassette 30*b*. The four-teeth section gear on the shaft of the main cam 104 rotates the take-up advance cams 154 50°, thereby axially moving the take-up shafts 48 and 50 to engage the second cassette 30*b*. The cam groove 128 then flips the pinch roller 72 back to the first capstan 32, thereby disengaging the pinch roller 74. Lastly, the direction of the tape motor 52 is again reversed to its original direction and the head 70 and the pinch roller assembly 80 are lowered to engage the second cassette 30*b*. The unit then plays the first track of the second cassette 30*b*. At this point, it will be recognized that the main cam 104 has rotated 360° and has stopped. The unit then plays the first track of the second cassette 30*b* until the motion detector senses the end of the tape and starts the function motor 54 once again, repeating the above cycle.

Finally, when the second track of the last cassette 30*e* has been played, the motion detector again senses the tape end and starts the function motor 54. The head 70 lifts, the track heads switch electronically, and the pinch rollers again flip. When the head 70 and the pinch roller assembly 80 are pulled past the last position, it hits a lever (not shown) which then releases the two independent spring loaded pawls 160 and 162 of the head advance ratchet 98 and the take-up advance ratchet 150. The head 70 and the pinch roller assembly 80 then spring back to the first cassette 30*a* and the take-up shafts 48 and 50 spring back axially to engage the first cassette 30*a*. This then completes the cycle of the tape recorder-reproducer 10.

Obviously, many modifications and variations of the present invention are possible in light of the above teaching and it should be understood that the foregoing disclosure relates to only a preferred embodiment of the invention and that numerous modifications or alterations may be made therein without departing from the spirit and the scope of the invention as set forth in the appended claims.

What is claimed is:

1. In a tape recorder-reproducer or the like adapted to receive and play a plurality of tape cassettes of the type having a plurality of separately playable record tracks, at least one of said record tracks being recorded in a direction opposite from a second of said record tracks, the improvement comprising:

a storage means for storing a plurality of cassettes;

a movable record-reproducer head;

a first drive means operable to drive the tape of a preselected one of said cassettes in said first direction and in said direction wherein said first drive means comprises a first motor means, a first and a second shaft means wherein said first and said second shaft means are operably associated with each of said plurality of cassettes and are operably connected to said first motor means, a plurality of tabs axially located along each of said shaft means wherein one of said tabs on each of said shaft means is adapted to engage one of said cassettes, and wherein said first motor means is adapted to drive said first shaft means when said tape is to be driven in said first direction and is adapted to drive said second shaft means when said tape is to be driven in said second direction; and a second drive means operable to move said head between a preselected plurality of positions wherein said head reproduces one of said tracks of said first cassette when in a first position and one of said tracks of said second cassette when in a second position and wherein said second drive means is further operable to select the cassette that is to have its tape driven by said first drive means and to enable said first drive means to drive said selected tape in a preselected direction.

2. The improvement of claim 1 wherein each of said shaft means is axially movable and wherein said second drive means causes a selected one of said shaft means to move axially thereby causing one of said tabs to engage a selected one of said cassettes thereby enabling said first drive means to drive the tape of said selected cassette.

3. The improvement of claim 2 wherein said second drive means comprises:

a second motor means; and a first cam means driven by said second motor means wherein said cam means is operable to actuate said first motor means.

4. The improvement of claim 3 wherein said first cam means is further operable to actuate said roller means and to reverse the direction of said first motor means.

5. The improvement of claim 4 wherein said first cam means is further operable to selectively axially move said first and second shaft means.

6. The improvement of claim 5 wherein said cam means if further operable to selectively start and stop said first motor means.

7. The improvement of claim 6 further comprising means for stopping said second motor means when said first motor means starts.

8. The improvement of claim 7 further comprising:

a first sensing means responsive to the conclusion of reproduction of said first record track of said first cassette wherein said first sensing means actuates said second motor means thereby actuating said first cam means whereby said first cam means causes said first motor means to reverse its direction and causes said roller means to disengage the first of said capstans and engage the second of said capstans thereby effectuating a reversal of the direction of travel of said tape in said first cassette.

9. The improvement of claim 8 further comprising:

a second sensing means responsive to the conclusion of reproduction of said second record track of said first cassette wherein said second sensing means actuates said second motor means thereby actuating said first cam means whereby said first cam means causes said shaft means to move axially, thereby causing one of said tabs to engage the second of said cassettes, whereby said first cam means causes said first motor means to reverse its direction and causes said roller means to disengage said second capstan and engage said first capstan, and whereby said first cam means causes said head to move from said first position to said second position, thereby enabling said head to reproduce said second cassette.

10. The improvement of claim 9 wherein said first cam means is adapted to rotate 360° for each of said cassettes.

11. The improvement of claim 10 further comprising means for disengaging said shafts from said cassettes after all of said cassettes have been reproduced.

12. The improvement of claim 11 wherein said storage means is removable from said tape recorder-reproducer.

* * * * *